US012717020B2

(12) United States Patent
Naka

(10) Patent No.: US 12,717,020 B2
(45) Date of Patent: Aug. 25, 2026

(54) VITAL DATA ACQUISITION SYSTEM, VITAL DATA ACQUISITION METHOD, AND RECORDING MEDIUM

(71) Applicant: Konica Minolta, Inc., Tokyo (JP)

(72) Inventor: Atsuhiro Naka, Hachioji (JP)

(73) Assignee: Konica Minolta, Inc., Toyko (JP)

( * ) Notice: Subject to any disclaimer, the term of this patent is extended or adjusted under 35 U.S.C. 154(b) by 373 days.

(21) Appl. No.: 18/446,950

(22) Filed: Aug. 9, 2023

(65) Prior Publication Data

US 2024/0053466 A1 Feb. 15, 2024

(30) Foreign Application Priority Data

Aug. 10, 2022 (JP) ................................. 2022-127662

(51) Int. Cl.

| | |
|---|---|
| ***G01S 13/86*** | (2006.01) |
| ***G01S 3/02*** | (2006.01) |
| ***G01S 13/06*** | (2006.01) |
| ***G01S 13/50*** | (2006.01) |

(52) U.S. Cl.

CPC .............. *G01S 13/867* (2013.01); *G01S 3/02* (2013.01); *G01S 13/06* (2013.01); *G01S 13/50* (2013.01)

(58) Field of Classification Search

CPC ...... G01S 13/867; G01S 13/50; G01S 13/524; G01S 13/505; G01S 13/88; G01S 7/354; G06V 40/15; G06T 2207/10044

USPC ................... 342/27, 28, 84, 99, 50; 382/128

See application file for complete search history.

(56) References Cited

U.S. PATENT DOCUMENTS 11,327,169 B2 * 5/2022 Jeon ....................... G01S 13/867
11,694,446 B2 * 7/2023 Ko ....................... G06N 3/0464 382/103
12,105,195 B2 * 10/2024 Smith ....................... G08G 5/55
12,256,145 B2 * 3/2025 Omelchenko ........ H04N 23/611
12,310,761 B2 * 5/2025 Kaneko ................ A61B 5/7292
2013/0135137 A1 * 5/2013 Mulder ..................... G01S 3/48 342/28
2020/0116854 A1 * 4/2020 Jeon ...................... G01S 7/4026
2021/0383134 A1 * 12/2021 Ko ....................... G06V 20/647
2023/0092182 A1 * 3/2023 Andiappan .......... A61B 5/0507 600/301
2023/0171493 A1 * 6/2023 Omelchenko ......... G01S 13/867 348/346
2023/0243965 A1 * 8/2023 Smith ................. H01Q 21/065 342/29

FOREIGN PATENT DOCUMENTS

JP 2016-059718 A 4/2016
JP 2020091521 A 6/2020

OTHER PUBLICATIONS

Office Action issued in corresponding Japanese Patent Application No. 2022-127662, dated Apr. 7, 2026, with translation (8 pages).

* cited by examiner

*Primary Examiner* — Michael W Justice

(74) *Attorney, Agent, or Firm* — Osha Bergman Watanabe & Burton LLP

(57) ABSTRACT

A vital data acquisition system includes a hardware processor that:

sets an identified region, based on imaged information;
acquires vital data based on a detection result from a sensor; and
determines whether the identified region is correctly set based on the vital data.

14 Claims, 11 Drawing Sheets

Figure 1:
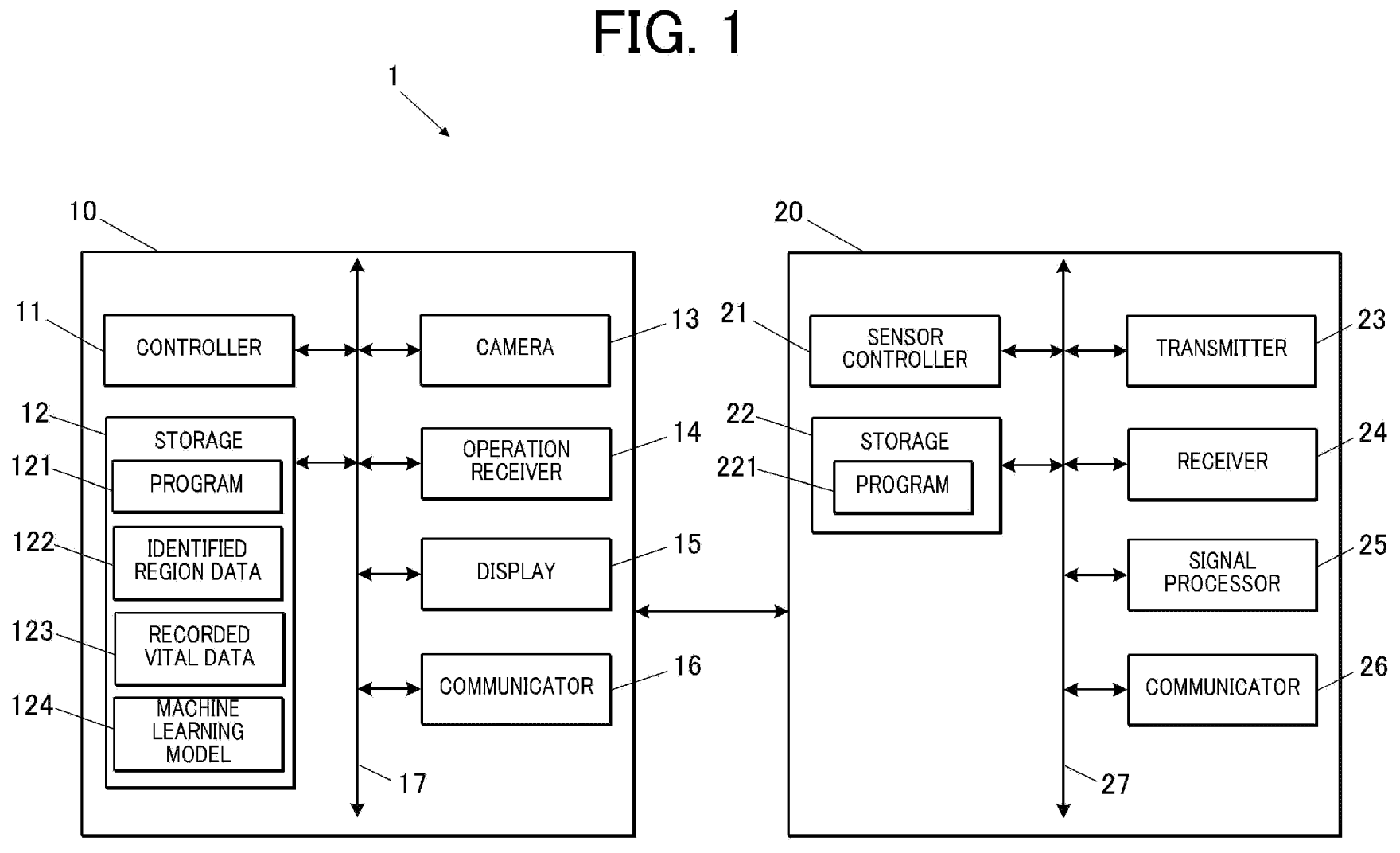

10
11 CONTROLLER
12 STORAGE
121 PROGRAM
122 IDENTIFIED REGION DATA
123 RECORDED VITAL DATA
124 MACHINE LEARNING MODEL
13 CAMERA
14 OPERATION RECEIVER
15 DISPLAY
16 COMMUNICATOR
17

20
21 SENSOR CONTROLLER
22 STORAGE
221 PROGRAM
23 TRANSMITTER
24 RECEIVER
25 SIGNAL PROCESSOR
26 COMMUNICATOR
27

STORAGE
COMMUNICATOR
SENSOR CONTROL LER
SIGNAL PROCESSOR
TRANSMITTER
SIGNAL GENERATOR
ADC
PHASE ADJUSTER
PHASE ADJUSTER
RECEIVER
TARGET
Ws
Wr
20
21
22
23
24
25
26
231
232
233
241
242
2421
2422

Im
60
50
40
30c
30b
30a
12

VITAL DATA ACQUISITION SYSTEM, VITAL DATA ACQUISITION METHOD, AND RECORDING MEDIUM

CROSS-REFERENCE TO RELATED APPLICATIONS

The entire disclosure of Japanese Patent Application No. 2022-127662 filed on Aug. 10, 2022 is incorporated herein by reference.

BACKGROUND

Technical Field

The present invention relates to a vital data acquisition system, a vital data acquisition method, and a recording medium.

Description of Related Art

Conventionally, a technique has been known that transmits radio waves to a living body, such as of a person, and acquires vital data in a non-contact manner on the basis of a detection result of the reflected waves from a sensor (e.g., JP 2016-59718A). The technique can be preferably used in a case of detecting the state of a person at a predetermined position, for example, during sleep hours.

However, in a case where the position of a living body as a detection object is not predetermined, it is not easy to appropriately identify the position of the detection object only from the detection result from the sensor, and acquire vital data. This is because vibrations of objects and the like around the living body are also detectable by the sensor and it is thus difficult to determine whether the motion of the living body is reflected in the detection result from the sensor. If detection by the sensor is performed in a state where identification of the position of the detection object is insufficient, vibrations other than those of the vital data are also detected, thereby inappropriate vital data is acquired.

As described above, according to the conventional technique, it is difficult to appropriately identify the detection object, and acquire vital data. Furthermore, the conventional technique supports only one identified region.

SUMMARY

One or more embodiments of the present invention provide a vital data acquisition system, a vital data acquisition method, and a recording medium that can more appropriately identify a detection object, and acquire vital data.

Moreover, one or more embodiments of the present invention provide a vital data acquisition system that supports a plurality of identified regions.

According to an aspect of the present invention, a vital data acquisition system includes:

- a hardware processor that: sets an identified region, based on imaged information;
- acquires vital data based on a detection result from a sensor; and
- determines whether the identified region is correctly set based on the vital data.

According to an aspect of the present invention, a vital data acquisition method is

- a vital data acquisition method executed by a hardware processor of a computer of a vital data acquisition system, the method including:
- setting an identified region, based on imaged information;
- acquiring vital data based on a detection result from a sensor; and
- determining whether the identified region is correctly set based on the vital data.

According to an aspect of the present invention, a recording medium is

- a non-transitory computer readable recording medium storing instructions causing a computer of a vital data acquisition system to execute:
- setting an identified region, based on imaged information;
- acquiring vital data based on a detection result from a sensor; and
- determining whether the identified region is correctly set based on the vital data.

According to an aspect of the present invention, a vital data acquisition system includes:

- a hardware processor that:
- sets a plurality of identified regions, based on imaged information;
- acquires vital data based on a detection result from a sensor; and
- associates each of the plurality of set identified regions, with the acquired vital data.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention, wherein:

FIG. 1 is a block diagram showing a main functional configuration of a vital data acquisition system;

DETAILED DESCRIPTION (Overview of Vital Data Acquisition System)

Hereinafter, embodiments of the present invention will be described with reference to the drawings. However, the scope of the invention is not limited to the disclosed embodiments. First, referring to FIGS. 1 and 2, an overview of a vital data acquisition system 1 is described.

FIG. 1 is a block diagram showing a main functional configuration of the vital data acquisition system 1 of one or more embodiments of the present invention.

Figure 2:
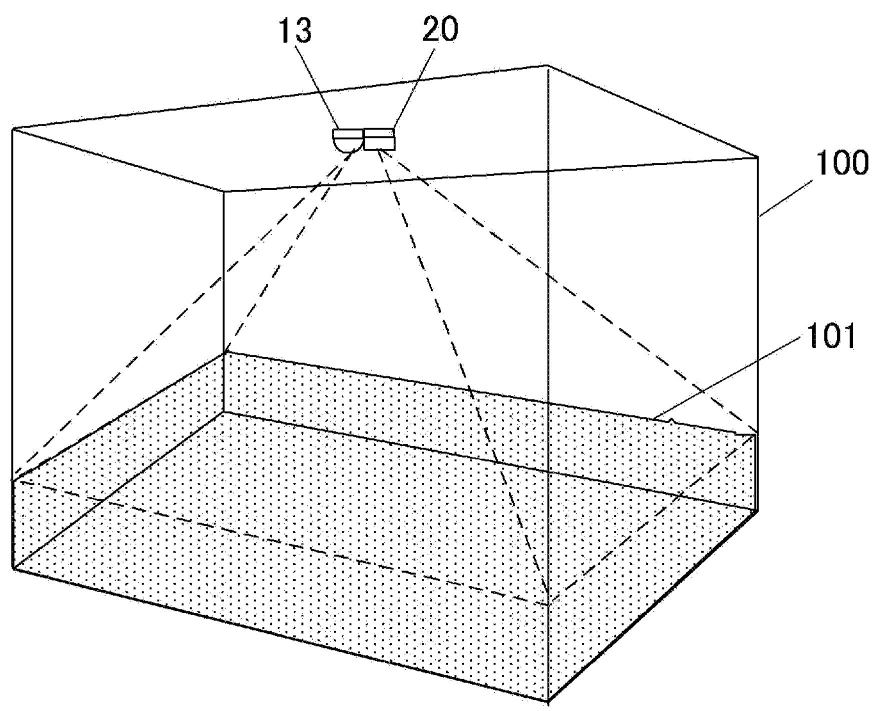
FIG. 2 shows an example of an installation mode of a camera and a sensor device of the vital data acquisition system.

FIG. 2 shows an example of an installation mode of a camera 13, and a sensor device 20 of the vital data acquisition system 1.

As shown in FIG. 1, the vital data acquisition system 1 includes an information processing device 10, and the sensor device 20 (sensor). The information processing device 10, and the sensor device 20 are connected to each other in a manner allowing data mutual communication. The information processing device 10 includes the camera 13. As shown in FIG. 2, the camera 13 of the information processing device 10, and the sensor device 20 in one or more embodiments are installed on a ceiling of a room 100 so as to face a floor.

Based on image data (information on an image) on an image Im (see FIG. 5) obtained through imaging an imaging range 101 viewed from the camera 13, the information processing device 10 sets identified regions R1, R2, . . . (see FIG. 6; hereinafter, in a case of indicating any one of the identified regions R1, R2, . . . , it is represented as "identified region R") that respectively represent the ranges of detection objects 30*a*, 30*b*, . . . (see FIG. 5; hereinafter, in a case of indicating any one of detection objects 30*a*, 30*b*, . . . , it is represented as "detection object 30"), such as people, in the imaging range 101.

The sensor device 20 is a millimeter-wave radar that detects the position (the distance and the direction), and velocity of a target by transmitting millimeter waves (radio waves), receiving reflected waves reflected by the target, and analyzing the waves. The sensor device 20 is configured such that a detection position of the sensor device 20 is adjustable. The sensor device 20 in one or more embodiments transmits millimeter waves to the imaging range 101, and generates vital data that includes information on respiration and/or heartbeats (pulses) and the like of the detection object 30, based on a detection result of the reflected waves. Hereinafter, reflected waves including the vital data among reflected waves obtained by emission to the imaging range 101 and reception by the sensor device 20 are represented as "identified reflected waves".

The information processing device 10 acquires, from the sensor device 20, information on the arrival angle (arrival direction) of the identified reflected waves including the vital data to the sensor device 20, and determines whether the identified region R is correctly set or not based on the relationship between the arrival angle of the identified reflected waves and the set identified region R. If it is determined that the identified region R is not correctly set, the excess or deficiency and positional deviation of the identified region R are corrected. The information processing device 10 continuously acquires, from the sensor device 20, the vital data about the identified region R determined to be correctly set (including the identified region R whose excess or deficiency and positional deviation have been corrected; hereinafter represented as "appropriate identified region R"), and records the data.

On the other hand, the sensor device 20 receives information on an appropriate identified region R from the information processing device 10, and subsequently, selectively detects reflected waves reflected in the appropriate identified region R. Accordingly, the processing load on the sensor device 20 is reduced.

As described above, through coordinated operation between the information processing device 10 and the sensor device 20, the vital data acquisition system 1 according to one or more embodiments can correctly capture the detection object 30 by the information processing device 10, and acquire appropriate vital data of the detection object 30, while reducing the processing load on the sensor device 20. The coordinated operation between the information processing device 10 and the sensor device 20 is described later in detail.

(Configuration of Information Processing Device)

Next, the configuration of the information processing device 10 is described.

As shown in FIG. 1, the information processing device 10 includes a controller 11 (hardware processor), a storage 12, a camera 13, an operation receiver 14, a display 15, and a communicator 16. The components of the information processing device 10 are connected to each other by a connection path 17, such as a bus.

The controller 11 is a hardware processor that includes a CPU (Central Processing Unit), and a RAM (Random Access Memory). The controller 11 controls the operation of each component of the information processing device 10 by executing various processes in accordance with a program or instructions such as a program 121 stored in the storage 12. Furthermore, the controller 11 executes the various processes in accordance with the program 121, thus functioning as a region setter, an acquirer, an association maker, a determiner, an information supplier, a record controller, and a notification controller.

The controller 11 may include a plurality of CPUs. A plurality of processes executed by the controller 11 in one or more embodiments may be executed by these CPUs in a shared manner.

The storage 12 is a non-transitory recording medium readable by the controller 11 as a computer, and is made up of an HDD (Hard Disk Drive), an SSD (Solid State Drive), etc. The storage 12 stores not only the program 121 to be executed by the controller 11, but also various data, such as identified region data 122 and recorded vital data 123, and a machine learning model 124, etc. The program 121 is stored in the storage 12 in a form of computer readable program code.

The identified region data 122 is data that represents a setting region of each identified region R set in the image Im.

The recorded vital data 123 is data obtained by recording vital data on the respiration and/or heartbeats (pulses) of the detection object 30 transmitted from the sensor device 20, in association with the identified region R.

The machine learning model 124 is a learned model achieved through machine learning using data (detection object information) on an image pertaining to the detection object 30 as training data. The machine learning model 124 extracts the feature amount of the input image Im, and recognizes each detection object 30 included in the image Im. For example, the machine learning model 124 outputs information on the degree of the possibility of the detection object 30 with respect to each candidate of the detection object 30 included in the image Im. Based on the recognition result of the detection object 30 by the machine learning model 124, the controller 11 sets each identified region R in the image Im, and stores the region in the identified region data 122. For example, the controller 11 sets the identified region R for the recognition result having a degree of possibility of the detection object 30 equal to or more than a predetermined threshold. It may be assumed that the machine learning model 124 also performs setting of each identified region R. The configuration of the machine learning model 124 is not specifically limited, and may be, for example, what uses a neural network, for example.

The camera 13 images the imaging range 101 at a predetermined frame rate, generates image data of the image Im, and outputs the data to the controller 11. The camera 13 may be what generates color image data using an R (red), G (green) and B (blue) image pickup element, or generates monochrome image data. The camera 13 may be an IR (infrared) camera that can take an image in a dark environment by an image pickup element that detects near-infrared light. A camera that detects visible light, and an IR camera may be used in a combined manner. A depth camera that can acquire depth information on the depth of an imaging subject can also be used in a combined manner. The camera 13 may be provided separately from a main body (housing) of the information processing device 10, and communicably connected to the main body in a wired or wireless manner. For example, the camera 13 may be installed on the ceiling of the room 100, and the main body of the information processing device 10 may be installed inside or outside of the room 100 or at a distant place.

The operation receiver 14 includes a pointing device, such as a mouse, and a keyboard, accepts a position input and a key input by the user, and outputs the operation information to the controller 11.

The display 15 includes a display device, such as a liquid crystal display, and displays various processing results, such as of setting situations of the identified regions R in the image Im, various notifications, and various statuses, in accordance with a control signal from the controller 11. The display 15 is one mode of a notifier that issues various notifications pertaining to setting of each identified region R and to acquisition of vital data.

The communicator 16 is a communication interface that controls data communication with the sensor device 20. In accordance with control by the controller 11, the communicator 16 acquires detection result data, such as vital data, from the sensor device 20, and transmits data on the identified region R to the sensor device 20.

(Configuration of Sensor Device)

Figure 3:
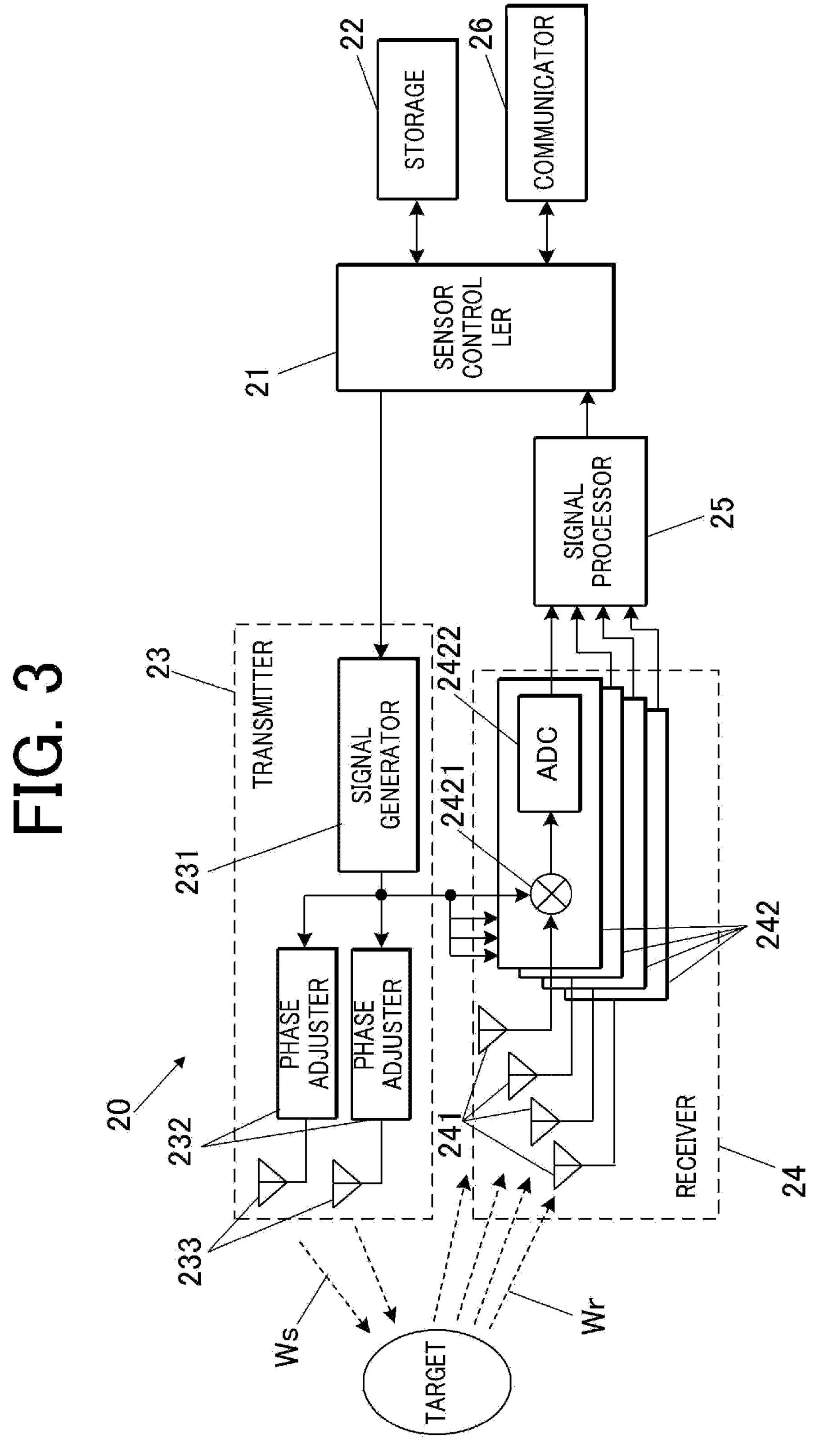
FIG. 3 is a block diagram showing a detailed functional configuration of the sensor device.
Figures 4, 5:
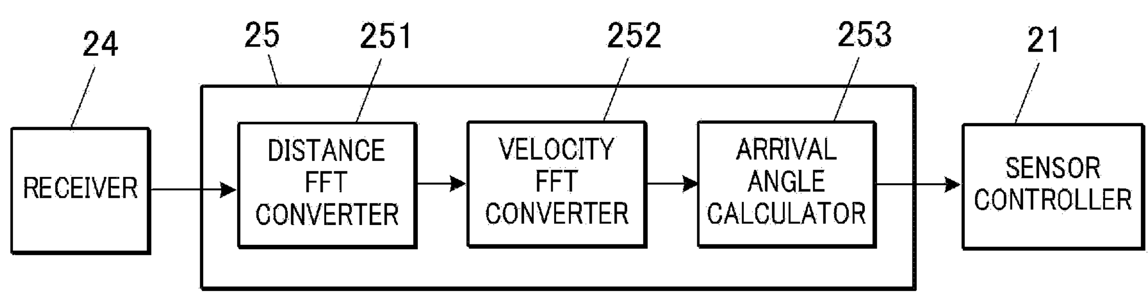
FIG. 4 shows a block diagram showing a functional configuration of a signal processor.
FIG. 5 shows an example of an image taken by the camera.

Next, referring to FIGS. 1, 3, and 4, the configuration of the sensor device 20 is described.

FIG. 3 is a block diagram showing a detailed functional configuration of the sensor device 20.

The sensor device 20 includes a sensor controller 21, a storage 22, a transmitter 23, a receiver 24, a signal processor 25, and a communicator 26. The components of the sensor device 20 are connected to each other by a connection path 27 (see FIG. 1), such as a bus.

The sensor device 20 in one or more embodiments is a radar of a frequency modulated continuous wave scheme (hereinafter described as an FMCW scheme) that linearly and periodically changes, with time, the frequency of radio waves to be transmitted. The FMCW scheme radar detects the round-trip time period of radio waves with respect to a target, i.e., the distance, based on the frequency of the beat signal due to the frequency difference between the transmission signal of continuously modulated transmission waves, and the reception signal of reflected waves. Based on the phases of multiple reception signals detected at the respective different timings, the velocity of the target is detected. Based on the phases of reception signals respectively detected by a plurality of receiving antennas 241, the direction of the target (the arrival angle of reflected waves reflected by the target to the sensor device 20) is detected. The sensor device 20 can detect a stationary target, and can detect the motion and vibrations when the target is moving and vibrating. Through use of radio waves, the motion of the target can be detected in a non-contact manner. Because no visible light is used, there is an advantage that the detection object 30 is unlikely notice (not annoying for the detection object 30). The sensor device 20 in one or more embodiments uses radio waves in a frequency band from 30 to 300 GHz with a wavelength ranging from 1 to 10 mm. This is because use with existing radio facilities is facilitated while legislative regulations of each country and each region stipulate use of a millimeter waveband of 60 GHz or higher in the case of the method described above, even though it is desirable to use broadband radio waves having a frequency bandwidth of about 1 GHz or higher in order to increase the distance resolution.

The sensor controller 21 is a hardware processor that includes a CPU, and a RAM. The sensor controller 21 controls the operation of each component of the sensor device 20 by executing various processes in accordance with a program or instructions such as a program 221 stored in the storage 22. The sensor controller 21 may include a plurality of CPUs. A plurality of processes executed by the sensor controller 21 in one or more embodiments may be executed by these CPUs in a shared manner.

The storage 22 is a non-transitory recording medium that is readable by the sensor controller 21, i.e., a computer, and is made up of a flash memory. As shown in FIG. 1, the storage 22 stores not only the program 221 executed by the sensor controller 21, but also detection result data that includes vital data and information on the arrival angle of reflected waves. The program 221 is stored in the storage 22 in a form of computer readable program code.

As shown in FIG. 3, the transmitter 23 includes a signal generator 231, a plurality of (two in FIG. 3) transmitting antennas 233, and phase adjusters 232 provided in association with the respective transmitting antennas 233.

The signal generator 231 generates a transmission signal to be transmitted as transmission waves Ws from each transmitting antenna 233 in accordance with control by the sensor controller 21. The signal generator 231 in one or more embodiments generates, as a transmission signal, a chirp signal that has a frequency linearly and periodically changing with time. The frequency change per unit time (the slope of a linear function representing the frequency change with time) of the chirp signal is defined depending on the distance to the detection object 30, and is determined in accordance with a control signal from the sensor controller 21.

The phase adjusters 232 adjust the phases of transmission signals generated by the signal generator 231 for the respective transmitting antennas 233. By the phase adjustment, the wave fronts of the transmission waves Ws transmitted from the respective transmitting antennas 233 are controlled, and the transmission direction and the directionality can be adjusted. That is, the transmission directions of the transmission waves Ws transmitted from the transmitting antennas 233 can be freely designated.

The transmitting antennas 233 transmit the transmission signals output from the respective phase adjusters 232, as the transmission waves Ws (radio waves). The plurality of transmitting antennas 233 are regularly arranged on the same plane. A signal amplifier, not shown, may be provided between the signal generator 231 and each transmitting antenna 233. The transmission waves Ws transmitted from each transmitting antenna 233 are emitted to the target, such as the detection object 30, and reflected waves Wr reflected by the surface of the target are detected by the receiver 24.

The receiver 24 includes a plurality of (four in FIG. 3) receiving antennas 241, and individual receivers 242 provided in association with the respective receiving antennas 241.

The plurality of receiving antennas 241 are regularly arranged (for example, in a matrix manner) on the same plane. Each receiving antenna 241 outputs an electric signal in accordance with the received reflected waves Wr. The sensor device 20 in one or more embodiments adopts MIMO (Multiple Input Multiple Output) that increases the number of receiving antennas 241 in a simulated manner by the plurality of receiving antennas 241 receiving radio waves transmitted from the plurality of transmitting antennas 233. Use of MIMO can generate virtual receiving antennas whose number is more than that of the actual receiving antennas 241 using the phase differences between the transmitting and receiving antennas. Thus, the antenna aperture is virtually enlarged, and the angle detection resolution of the target can be improved in the small sensor device 20.

Each individual receiver 242 includes a mixer 2421, an ADC (analog-to-digital converter) 2422. A signal amplifier, not shown, may be provided between each receiving antenna 241 and the corresponding individual receiver 242.

The mixer 2421 mixes the reception signal received by the receiving antenna 241 with the transmission signal generated by the signal generator 231 of the transmitter 23, and generates a beat signal corresponding to the difference between the reception signal and the transmission signal. The beat signal is appropriately frequency-converted, and is input as an IF (Intermediate Frequency) signal into the ADC 2422. The reception signal corresponds to a signal obtained by delaying the transmission signal by a time period corresponding to the distance to the target. Here, the transmission signal is a chirp signal having a linearly changing frequency. Consequently, the reception signal is a signal having a frequency changed from that of the transmission signal by a change width depending on the distance to the target. Consequently, the frequency of the IF signal (beat signal) has a magnitude in accordance with the round-trip time period to the target, i.e., the distance to the target. If there are a plurality of targets having distances from the sensor device 20 that are different from each other, the IF signal is a signal where signals having a plurality of frequencies corresponding to the respective targets are mixed.

The ADC 2422 converts the input IF signal into a digital signal.

The reception signals of the reflected waves Wr received by the plurality of receiving antennas 241 are processed by the respective individual receivers 242 corresponding to the receiving antennas 241. From each individual receiver 242, the IF signal, transformed as the digital signal, is output to the signal processor 25.

FIG. 4 shows a block diagram showing the functional configuration of the signal processor 25.

The signal processor 25 includes a distance FFT (Fast Fourier Transform) converter 251, a velocity FFT converter 252, and an arrival angle calculator 253.

The distance FFT converter 251 executes a process of applying high speed Fourier transform to the IF signal received from the receiver 24 (hereinafter described as "distance FFT process"), and calculates the distance to the target. As described above, the frequency of the IF signal is a value in accordance with the distance to the target. Accordingly, by applying the distance FFT process to the IF signal, the distance to the target can be identified from the peak frequency of the processing result signal.

The velocity FFT converter 252 executes a process of applying again a high speed Fourier transform to the signal subjected to the distance FFT process by the distance FFT converter 251 (hereinafter, described as "velocity FFT process"), and calculates the velocity of the target. The plurality of signals obtained by the distance FFT converter 251 applying the distance FFT process to the plurality of reception signals with different reception timings include phase differences depending to the velocity of the target. Thus, by applying the velocity FFT process to the plurality of the signals having been subjected to the distance FFT process, the velocity of the target can be identified from the peak angular frequency of the processing result signals. Alternatively, the acceleration of the target may be calculated by differentiating the obtained velocity.

The arrival angle calculator 253 calculates the direction of the target, i.e., the arrival angle of the reflected waves Wr reflected by the target to the sensor device 20, based on the signals subjected to the velocity FFT process by the velocity FFT converter 252. When the arrival angle of the reflected waves Wr is inclined from the arrangement plane of the receiving antennas 241, a deviation depending on the arrival angle occurs in the timing of receiving the reflected waves Wr by each of the receiving antennas 241 (including the virtual receiving antennas described above). The deviation appears as a phase difference in the signal as a result of application of the velocity FFT process to the reception signal corresponding to each receiving antenna 241. Accordingly, by executing a process of applying a high speed Fourier transform (hereinafter described as "angular FFT process") to the results of the velocity FFT process corresponding to the respective receiving antennas 241, the direction of each target can be identified from the peak angular frequency in the signal after the angular FFT process. By processing the reception signals by the two-dimensionally arranged receiving antennas 241 (multiple virtual receiving antennas) according to a publicly known algorithm based on the principle described above, the arrival angle of the reflected waves Wr from the target at any position in the imaging range 101 can be calculated.

The aforementioned distance FFT process, velocity FFT process, and angular FFT process may perform an adaptive threshold determination, such as CFAR (Constant False Alarm Rate), for the result of the high speed Fourier transform, and extract the peak exceeding the threshold.

The calculation result of the distance by the distance FFT converter 251, the calculation result of the velocity by the velocity FFT converter 252, and the calculation result of the arrival angle by the arrival angle calculator 253 (hereinafter, described comprehensively as "signal processing results") are output to the sensor controller 21.

Based on the input signal processing results, the sensor controller 21 identifies the arrival angle of the reflected waves that indicates that the target (the reflective site of radio waves) is moving (at least one of the velocity and the acceleration of the target is not zero). Hereinafter, the reflection position of the reflected waves (the point on the moving target) is indicated as "reaction point P (see FIG. 7)".

Based on the signal processing results, the sensor controller 21 identifies the arrival direction of the identified reflected waves, where the vital data is detected, among the received reflected waves. The vital data is data representing that the target (reaction point P) having reflected the radio waves is periodically moving at a period satisfying a predetermined condition, and for example, data representing the periodical movement pertaining to the respiration and heartbeats (pulses) of the detection object 30. For example, the predetermined condition described above may be defined so as to include a range from 0.2 to 0.4 Hz in terms of respiration, and be defined so as to include a range from 1 to 2 Hz in terms of heartbeats. Hereinafter, the reflection position of the identified reflected waves (a point on the breathing and/or pulsating detection object 30) is described as "identified reaction point PS (see FIG. 8)". The vital data on respiration and heartbeats can be generated by any of various publicly known methods. For example, when the transmission signal and the reception signal are mixed by the mixer 2421, and the IF signal is generated, a method may be used that generates an I signal, and a Q signal obtained by delaying the I signal by a phase of 90 degrees, and detects the respiration and heartbeats from phase change in Lissajous figures of the I signal and the Q signal.

The sensor controller 21 performs a tracking process for each identified reaction point PS where the vital data is generated. The tracking process predicts the next detection position, based on the movement direction and the velocity of each identified reaction point PS, identifies the identified reaction point PS by comparing the actual detection position with the predicted position, thus achieving tracking. Before the tracking process, the sensor controller 21 may perform a clustering process of integrating the multiple identified reaction points PS. In the clustering process, when information on the identified region R is received from the information processing device 10 as described later, the multiple identified reaction points PS included in the single identified region R may be integrated.

Note that part of the process performed by the sensor controller 21 may be executed by the signal processor 25. Part of or the entire process performed by the signal processor 25 may be executed by the sensor controller 21.

Referring to FIG. 3, the communicator 26 is a communication interface that controls data communication with the information processing device 10. In accordance with control by the sensor controller 21, the communicator 26 transmits detection result data, such as vital data, to the information processing device 10, and receives data on the identified region R from the information processing device 10.

(Operation of Vital Data Acquisition System)

Next, the operation of the vital data acquisition system 1 is described.

Hereinafter, a case where a plurality of infants sleeping in the room 100 shown in FIG. 2 are observed as the detection objects 30 is exemplified and described. It is assumed that the camera 13 of the information processing device 10, and the sensor device 20 are attached at positions adjacent to each other on the ceiling of the room 100, and the sensor device 20 can emit transmission waves to the imaging range 101 viewed from the camera 13, and detect each target. It is also assumed that the arrival angle of reflected waves detected by the sensor device 20, and the position in the image Im taken by the camera 13 are preliminarily associated with each other. That is, it is assumed that based on the arrival angle of the reflected waves, calibration is preliminarily made so that the position of the target reflecting the reflected waves in the image Im (the reflection position, or reflection point) can be identified. In other words, it is assumed that any position in the taken image Im can be represented by coordinates, and based on the arrival angle of reflected waves, the coordinates of the point that corresponds to the arrival angle can be identified.

FIG. 5 shows an example of the image Im taken by the camera 13.

The image Im shown in FIG. 5 includes three infants (detection objects 30*a* to 30*c*) lying on the floor in the room 100, a wall-mounted calendar 40, a door 50, a curtain 60, etc. It is assumed that a person is printed on the calendar 40 among them. When the inside of the room 100 is dark, the detection objects 30 can be clearly imaged using an IR camera.

After image data of the image Im is taken, the feature amount of the image Im is extracted by the machine learning model 124, and the detection object 30 included in the image Im is recognized. The machine learning model 124 in one or more embodiments recognizes the head including the face of the detection object 30 in the image Im, and also recognizes the range of the entire body of the detection object 30 including the head. For further details, the machine learning model 124 has been subjected to machine learning so that the model can recognize the range including the torso and limbs corresponding to the head, as the range of the entire body, and the model has been subjected to machine learning so that even when the torso and limbs are partially or entirely covered with bedclothes or the like, the model can also recognize the part of the torso and the limbs covered with the bedclothes, as the range of the body. When the image Im includes a plurality of detection objects 30, the machine learning model 124 separately recognizes each of the detection objects 30. Based on the recognition result of each detection object 30 by the machine learning model 124, the identified region R corresponding to each detection object 30 concerned is set in the image Im. The information, such as on the setting region of the identified region R, is stored in the identified region data 122 in the storage 12.

Figure 6:
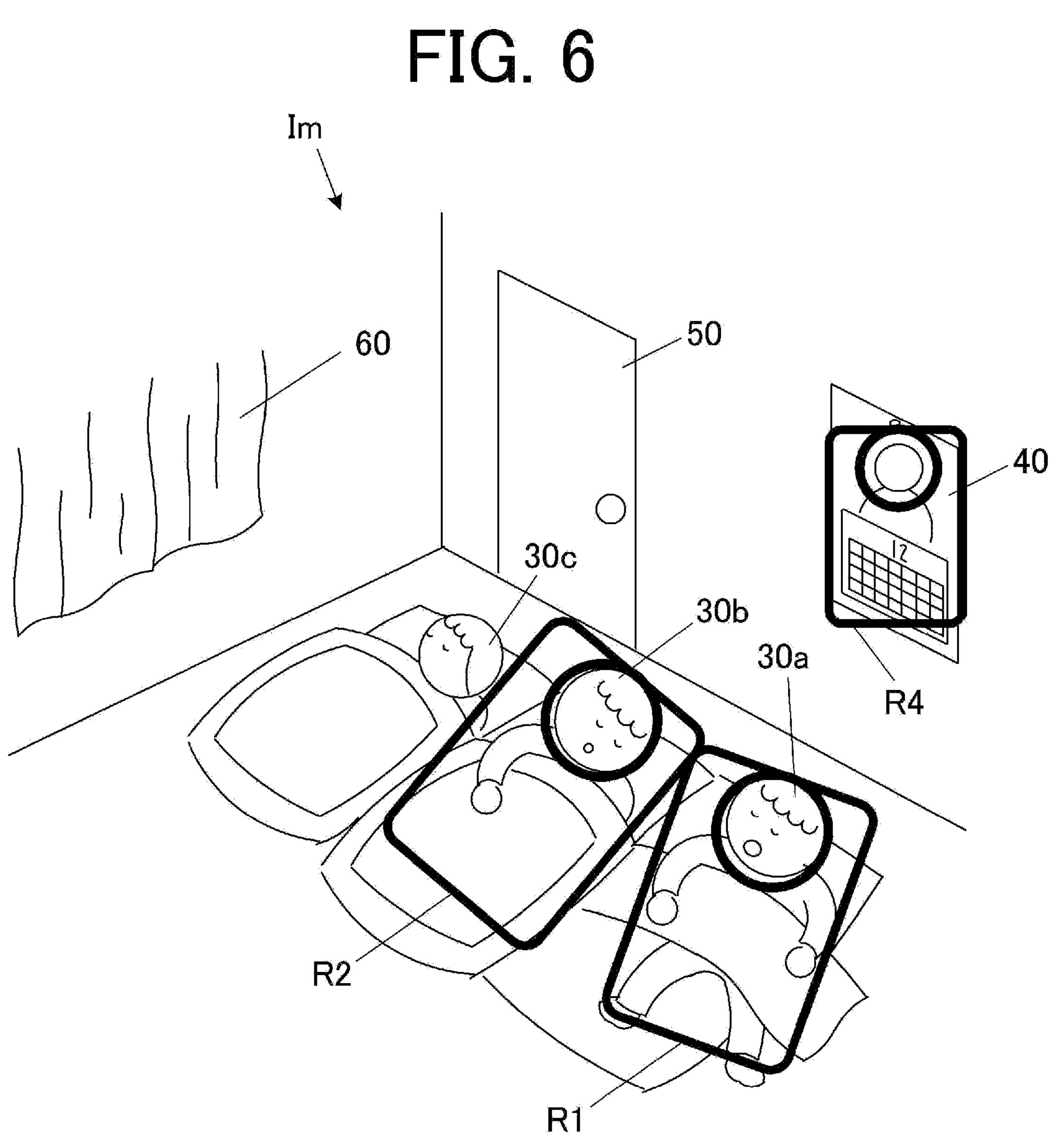
FIG. 6 shows an example of set identified regions.

FIG. 6 shows an example of the set identified regions R.

In the example shown in FIG. 6, substantially rectangular identified regions R1 and R2 each including the range of the entire body are respectively set for two detection objects 30*a* and 30*b* among the three detection objects 30*a* to 30*c*. It is assumed that no identified region R is set for the remaining one detection object 30*c* owing to insufficient recognition by the machine learning model 124. On the other hand, it is assumed that a person imaged in the calendar 40 is erroneously detected (erroneously recognized) as the detection object 30, and an identified region R4 is set at the position of the calendar 40. The image Im in FIG. 6 where the identified regions R are set is displayed on the display 15 so as to allow the user of the vital data acquisition system 1 to confirm this.

The information processing device 10 recognizes the detection object 30 by the machine learning model 124, and sets the identified region R, every time a new image Im is taken by the camera 13. The identified region R identified in an image Im, and the identified region R identified in the image Im taken next time are associated with each other, and identification of the identified region R corresponding to each detection object 30 is continued.

If the information processing device 10 can acquire information on the distance from the camera 13 and the sensor device 20 to the set identified region R, the device 10 may transmit distance information on the distance to the sensor device 20. The sensor device 20 having received the information on the distance adjusts the setting pertaining to the target detection distance range, based on the information. Specifically, the slope of the linear function representing the frequency change of the chirp signal pertaining to the transmission waves is adjusted so that the identified region R can be in a measurable distance range. The distance information on the distance from the camera 13 and the sensor device 20 to the identified region R is a mode of "sensor control information used to control the operation of the sensor".

The sensor device 20 transmits transmission waves to the imaging range 101, and receives reflected waves reflected from each of targets, such as the detection objects 30, the floor, and the wall, imaged in the image Im. The position (the distance, and the arrival angle) and velocity of the target are calculated by the method described above, and the arrival angle of reflected waves representing that the target is moving is identified in the received reflected waves. The information on the arrival angle (hereinafter, also represented as "reaction point information") is transmitted from the sensor device 20 to the information processing device 10.

When the information processing device 10 receives the reaction point information, this device identifies the position (coordinates in the image Im) of each reaction point P corresponding to the arrival angle indicated by the reaction point information.

Figure 7:
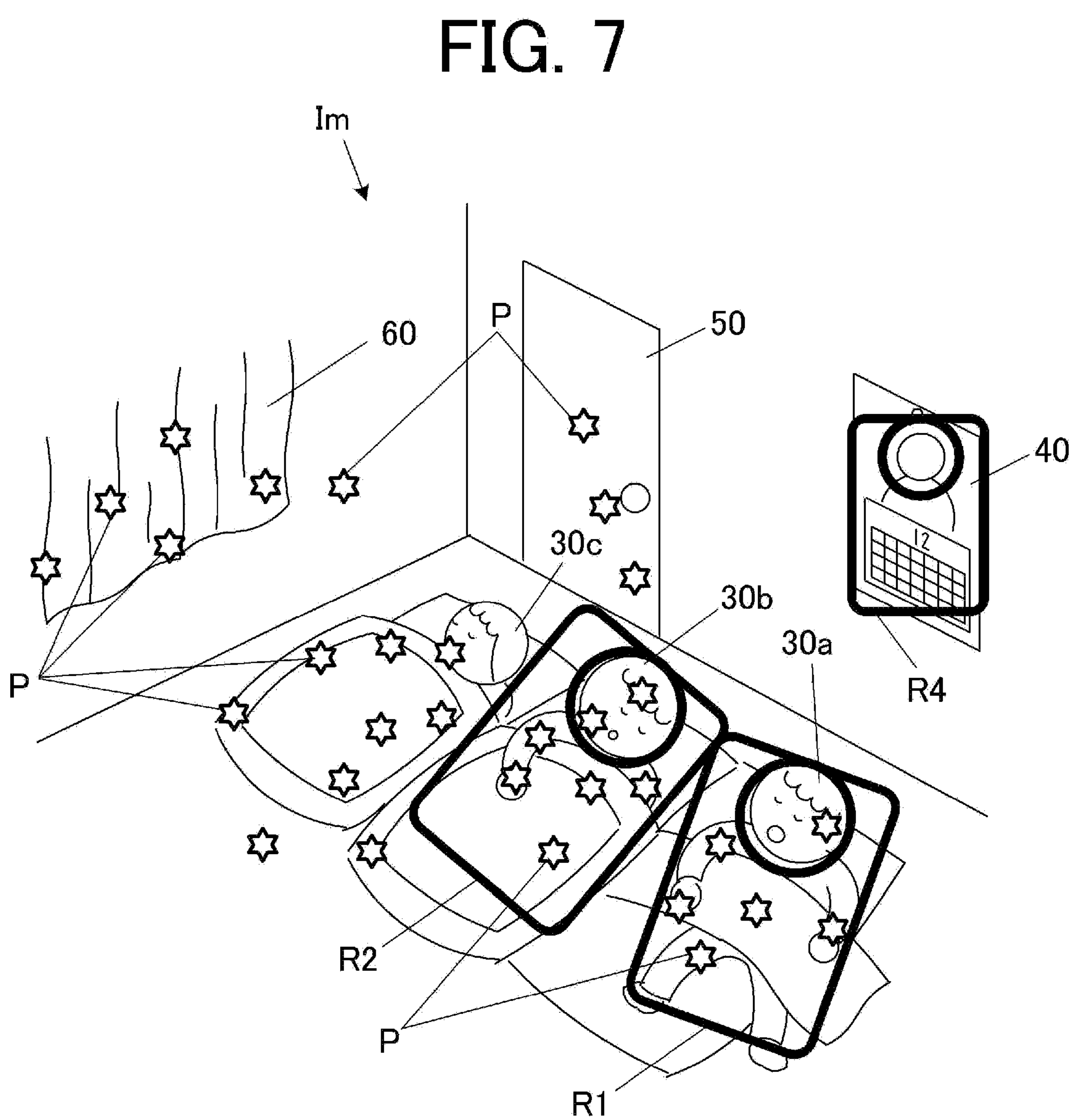
FIG. 7 shows an example of a distribution of reaction points in the image.

FIG. 7 shows an example of the distribution of reaction points P in the image Im.

In the example shown in FIG. 7, the plurality of reaction points P are distributed at positions overlaid on the three detection objects 30*a* to 30*c* (in the identified regions R1 and R2). This is because the motions in accordance with the respiration and heartbeats of the detection objects 30*a* to 30*c* are detected. The reaction points P are also distributed adjacent to the door 50 and the curtain 60. This is because vibrations of the floor and the door 50, wavering of the curtain 60 and the like are detected.

On the other hand, in the identified region R4 set based on erroneous detection pertaining to the calendar 40, no reaction point P is distributed. Typically, if the identified region R is appropriately set for each detection object 30, which is the living body, the reaction points P are detected in the identified region R. Accordingly, if no reaction point P is in a certain identified region R, this identified region R is determined to be based on erroneous detection (determined as an identified region R that is not correctly set). In this stage, this identified region R may be removed, or a notification indicating that the detection result of this identified region R is invalid may be issued to the display 15. Control to issue the notification may be performed by the controller 11 serving as the notifier, or performed by the controller 11 serving as the region setter.

The image Im in FIG. 7 where the identified regions R are set and the reaction points P are plotted is displayed on the display 15 so as to allow the user to confirm this.

Furthermore, the sensor device 20 tries to detect vital data, based on the signal processing results of reception signals of reflected waves in a certain time period. The sensor device 20 identifies the arrival angle of the identified reflected waves, where the vital data is detected, among the received reflected waves. The information on the arrival angle (hereinafter, also represented as "identified reaction point information") is transmitted from the sensor device 20 to the information processing device 10.

When the information processing device 10 receives the identified reaction point information, this device identifies the position (coordinates in the image Im) of each identified reaction point PS that corresponds to the arrival angle and is indicated by the identified reaction point information.

Figure 8:
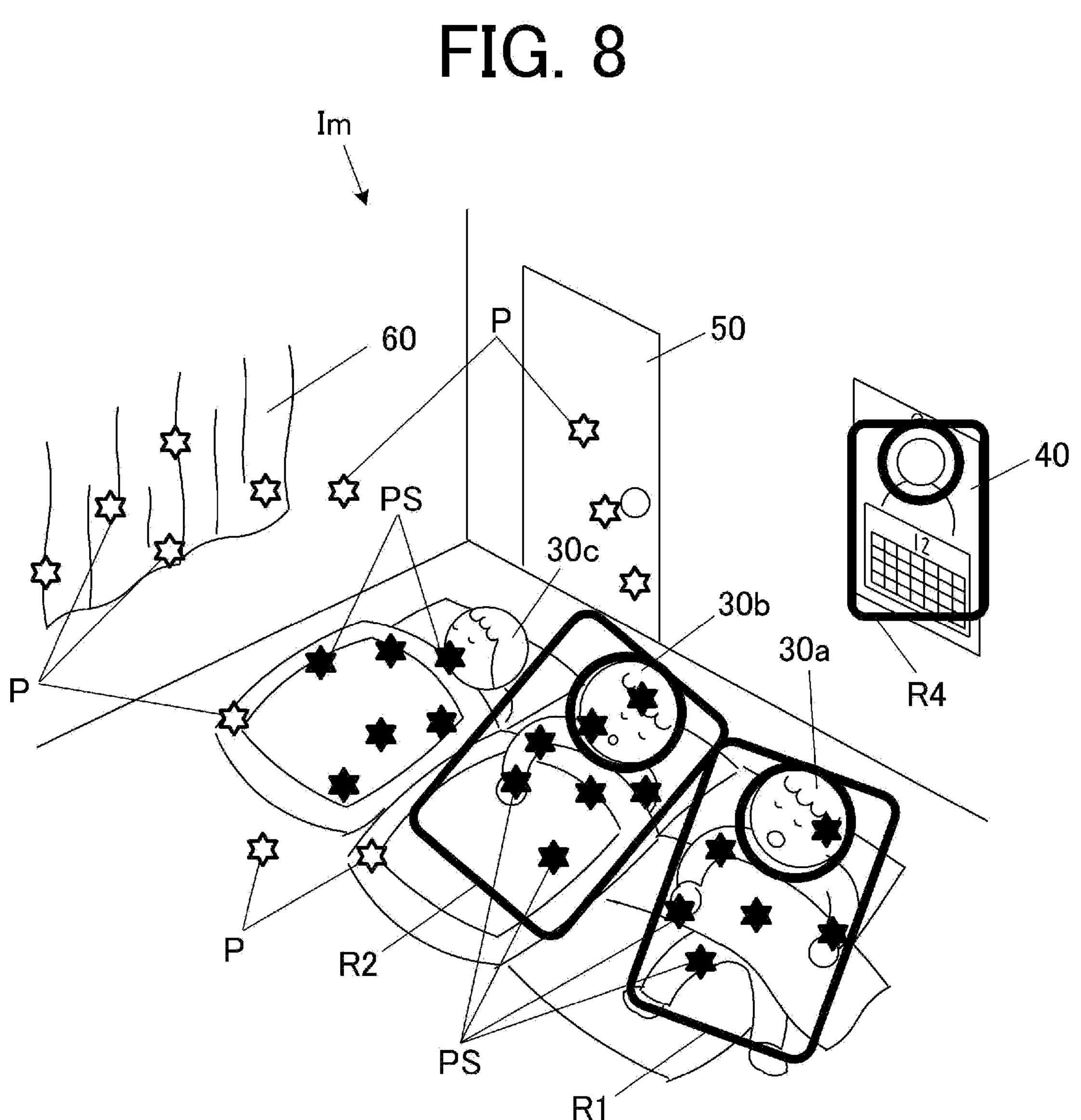
FIG. 8 shows an example of a distribution of identified reaction points in the image.

FIG. 8 shows an example of the distribution of the identified reaction points PS in the image Im.

In the example shown in FIG. 8, the plurality of identified reaction points PS are distributed at regions overlaid on the three detection objects 30*a* to 30*c*. This is because the vital data is detected from the periodical movement in accordance with the respiration and heartbeats of the detection objects 30*a* to 30*c*. Thus, the identified reaction points PS are distributed in the identified regions R1 and R2. As described above, if the identified reaction points PS are in the identified regions R, these identified regions R are determined to be correctly set.

Typically, if each identified region R is appropriately set in accordance with the detection object 30 of the living body, the reaction points P are detected in the identified region R. Accordingly, if no identified reaction point PS is in a set identified region R, it can be determined that this identified region R does not indicate the detection object 30, and has been erroneously detected. In the example shown in FIG. 8, no identified reaction point PS is in the identified region R4 set for the calendar 40. Accordingly, the identified region R4 is determined to be based on erroneous detection (determined to be an identified region R that is not correctly set). The identified region R4 determined to be erroneously detected is removed. A notification representing that the detection result of the identified region R4 is invalid may be output to the display 15.

In FIG. 8, at positions overlaid on one detection object 30*c* where no identified region R is set, identified reaction points PS are distributed. As described above, if the identified reaction points PS reside outside of the already set identified regions R, it is determined that the identified regions R are not correctly set, and an identified region R3 that internally includes the identified reaction points PS is newly set. The step of setting the new identified region R3 may include, for example, a step of re-recognizing the detection object 30*c* where the identified reaction points PS are detected and around this object by the machine learning model 124. Note that if the identified reaction points PS distributed outside of the identified region R are determined to belong to the detection object 30 corresponding to the existing identified region R as a result of re-recognition by the machine learning model 124, the range of the existing identified region R may be adjusted so as to internally include the identified reaction points PS. The newly set identified region R, and the identified region R whose range is adjusted are assumed to be encompassed in "identified region R determined to be correctly set".

Figure 9:
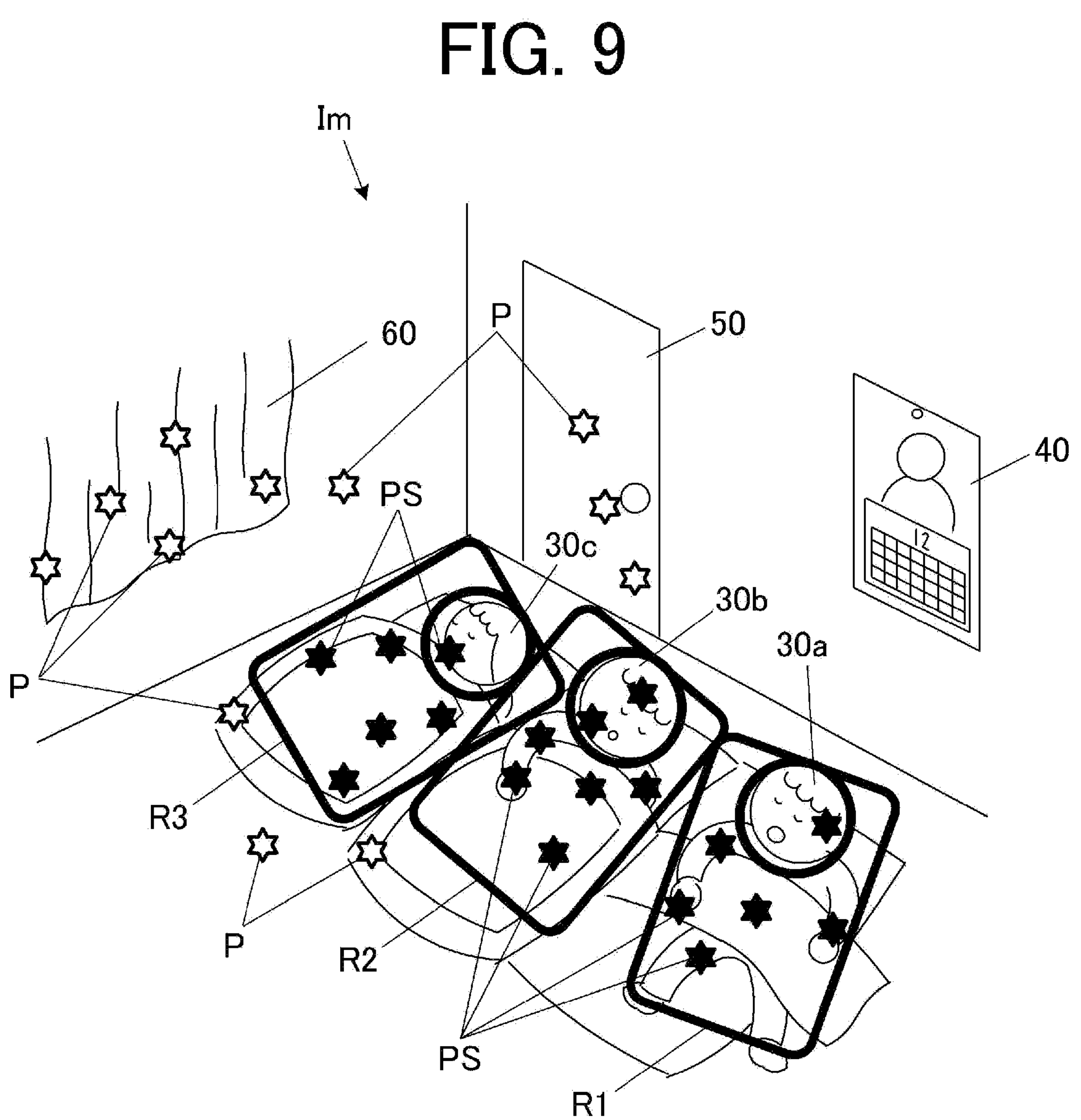
FIG. 9 shows corrected identified regions.

FIG. 9 shows the corrected identified regions R.

In FIG. 9, the identified region R4 determined to be erroneously detected is removed, and the identified region R3 having been subjected to insufficient detection is newly added. Thus, FIG. 9 shows the appropriate identified regions R1 to R3 determined to be correctly set. The information, such as on the setting regions of the corrected identified regions R, is reflected in the identified region data 122. Thus, the determination based on the relationships between the identified reaction points PS and the identified regions R can appropriately set the identified regions R.

Note that determination of appropriateness and correction of the identified regions R based on the identified reaction points PS may be executed every time the image Im is updated or every predetermined times of updating of the image Im.

The attitude of each detection object 30 may be estimated by image recognition for the appropriate identified regions R in the information processing device 10.

The image Im including the appropriate identified regions R shown in FIG. 9 is displayed on the display 15 so as to allow the user to confirm this. At this time, a notification of the correction content of the identified regions R may be displayed on the display 15, and accept adjustment of the identified regions R by the user. The notification of the correction content of the identified regions R described above is a mode of "notification of the result of determining the identified region R".

The information on the appropriate identified regions R (including setting region information of the identified regions R) is transmitted from the information processing device 10 to the sensor device 20, and is reflected in the operation of the sensor device 20. The information on the appropriate identified regions R is a mode of "sensor control information used to control the operation of the sensor".

Specifically, the sensor device 20 removes the reflected waves reflected outside of the appropriate identified regions R, from targets of the detection process by the sensor device 20, based on the information on the appropriate identified regions R. In other words, the sensor device 20 selectively detects reflected waves reflected in the appropriate identified regions R. Accordingly, the processing load on the sensor device 20 is reduced.

The sensor device 20 tracks the identified reaction points PS in the appropriate identified regions R, continuously generates vital data on these identified reaction points PS, and transmits the data to the information processing device 10. The information processing device 10 records each piece of vital data received in the recorded vital data 123 in the storage 12 in association with any of the identified region R. In other words, the information processing device 10 associates the pieces of vital data obtained with the respective set identified regions R, and records them in the recorded vital data 123.

(Vital Data Acquisition Process)

Subsequently, to achieve the aforementioned operation of the vital data acquisition system 1, the vital data acquisition process executed by the controller 11 of the information processing device 10, and the sensor controller 21 of the sensor device 20 is described.

Figure 10:
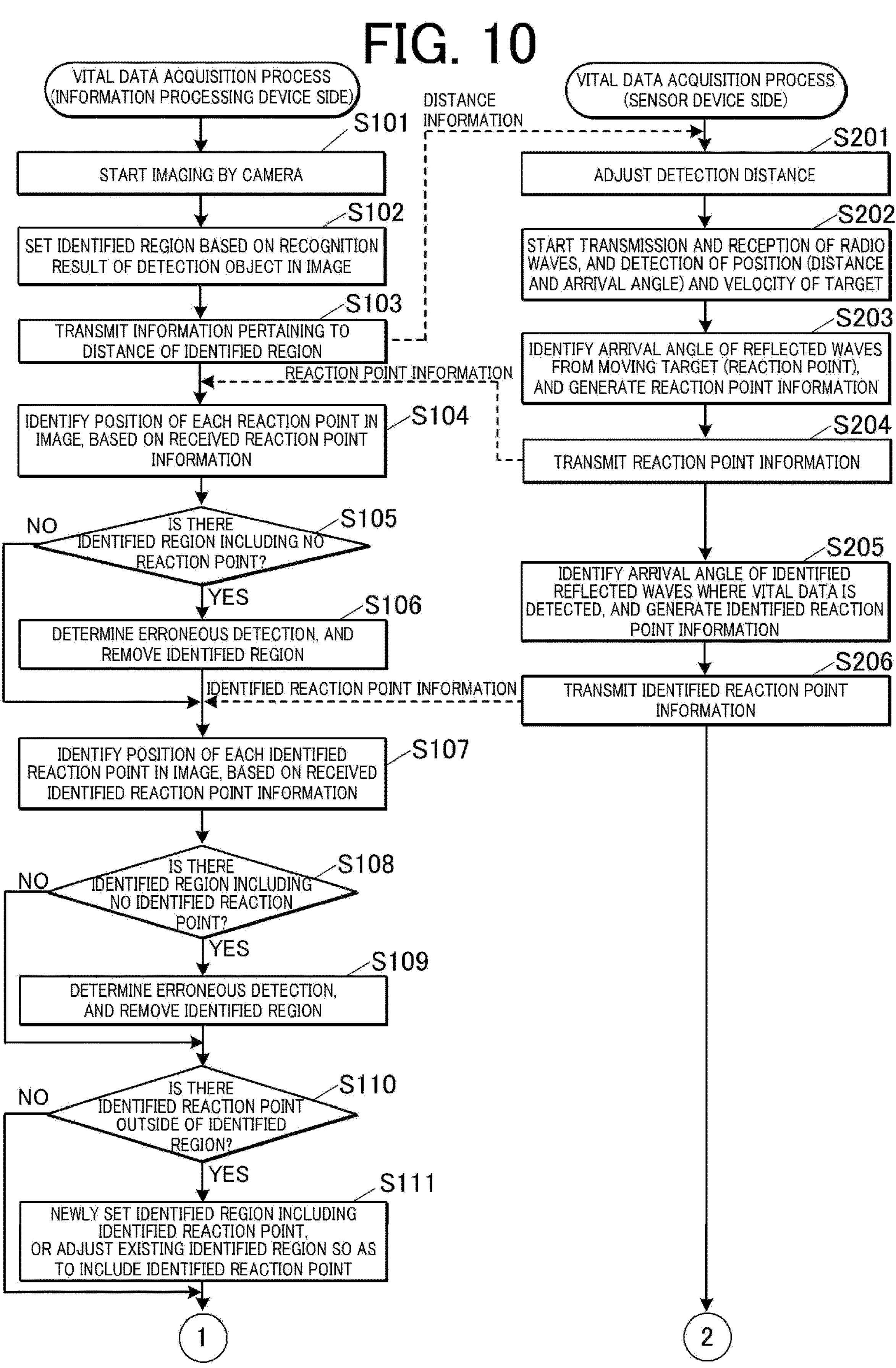
FIG. 10 is a flowchart showing control procedures of a vital data acquisition process.
Figure 11:
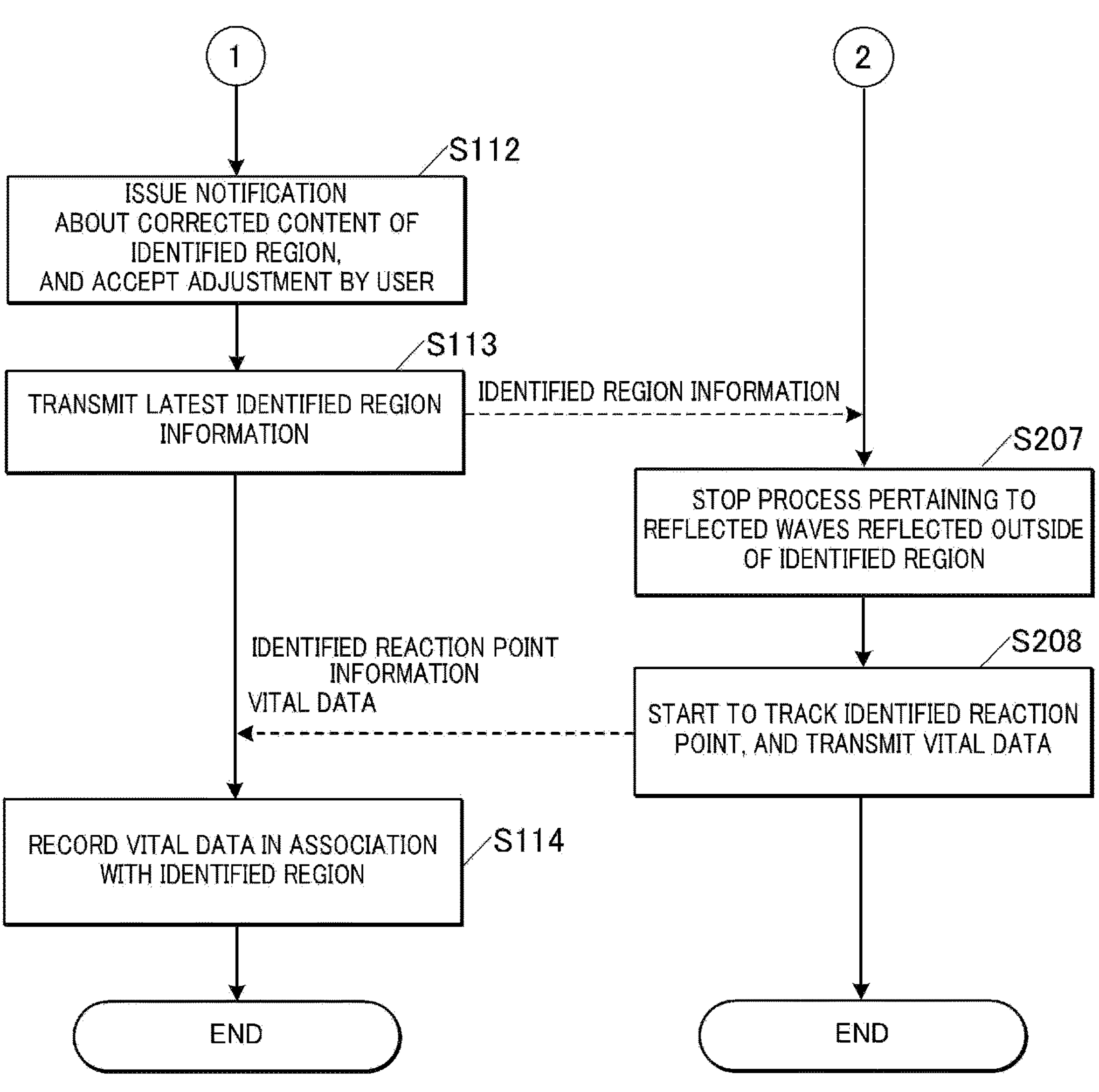
FIG. 11 is a flowchart showing the control procedures of the vital data acquisition process.

FIGS. 10 and 11 are flowcharts showing the control procedures of the vital data acquisition process.

In FIGS. 10 and 11, both the vital data acquisition process (process executed by the controller 11) in the information processing device 10, and the vital data acquisition process (process executed by the sensor controller 21) in the sensor device 20 are described. Data and information transmitted and received between the information processing device 10 and the sensor device 20 are indicated by broken lines.

For example, the vital data acquisition process is started when an instruction is issued by the user, or when start timing preset by a timer or an event trigger is reached.

When the vital data acquisition process is started, the controller 11 of the information processing device 10 supplies a control signal to the camera 13, and starts imaging of the imaging range 101 viewed from the camera 13 (Step S101). The controller 11 acquires image data of the taken image Im.

The controller 11 inputs the image Im into the machine learning model 124, and sets each identified region R based on the recognition result of the detection object 30 by the machine learning model 124 (Step S102). The controller 11 stores the information on the set identified regions R in the identified region data 122. Note that the machine learning model 124 may also set each identified region R, and the controller 11 may acquire the information of the set identified regions R.

The controller 11 acquires distance information on the distance from the camera 13 and the sensor device 20 to the identified region R, and transmits the information to the sensor device 20 (Step S103). The method of acquiring the distance information is not specifically limited. For example, the distance from the camera 13 and the sensor device 20 to each position in the imaging range 101 may be preliminarily measured and recorded, and when the identified region R is set, the distance corresponding to the position of the identified region R may be acquired. Alternatively, in the case where the camera 13 includes a depth camera, information on the distance to the identified region R acquired by the depth camera may be acquired.

Upon receipt of the distance information, the sensor controller 21 of the sensor device 20 adjusts the detection distance of the target by the sensor device 20 (or the detection position of the sensor device 20), based on the distance information (Step S201). For example, in the case of FMCW scheme, the sensor controller 21 adjusts the detection distance by adjusting the slope of the linear function representing the change in frequency of the chirp signal.

The sensor controller 21 starts transmission and reception of radio waves by the transmitter 23 and the receiver 24, and signal processing by the signal processor 25, and starts to detect the position (the distance and the arrival angle) and velocity of the target (Step S202). The sensor controller 21 identifies the arrival angle of reflected waves from the moving target (reaction point P) among reflected waves, and generates reaction point information that includes information on the arrival angle (Step S203). The sensor controller 21 transmits the generated reaction point information to the information processing device 10 (Step S204).

The controller 11 of the information processing device 10 identifies the position (coordinates) of each reaction point P in the image Im, based on the received reaction point information (Step S104). The controller 11 determines whether there is an identified region R that internally includes no reaction point P or not (Step S105). If it is determined that there is an identified region R including no reaction point P ("YES" in Step S105), the controller 11 determines that the identified region R concerned has been erroneously detected, and removes this identified region R from the identified region data 122 (Step S106). If it is determined that there is not an identified region R internally including no reaction point P (all the identified regions R internally include the reaction points P) ("NO" in Step S105), the controller 11 proceeds the processing to Step S107.

On the other hand, even after the transmission of the reaction point information (Step S204), the sensor controller 21 of the sensor device 20 continues analysis of the reception signal of the reflected waves, and tries to detect vital data. The sensor controller 21 identifies the arrival angle for each identified reaction point PS where the vital data is detected among reflected waves, and generates the identified reaction point information (Step S205). The sensor controller 21 transmits the generated identified reaction point information to the information processing device 10 (Step S206).

The controller 11 of the information processing device 10 identifies the position (coordinates) of each identified reaction point PS in the image Im, based on the received identified reaction point information (Step S107). The controller 11 determines whether there is an identified region R that internally includes no identified reaction point PS or not (Step S108). If it is determined that there is an identified region R internally including no identified reaction point PS ("YES" in Step S108), the controller 11 determines that the identified region R has been erroneously detected, and removes the identified region R concerned from the identified region data 122 (Step S109). Even if Steps S105 and S106 described above are omitted, the identified region R that should have been removed in Step S106 is surely removed in Step S109. Accordingly, to reduce the processing load and the processing time and the like, Steps S105 and S106 may be omitted.

If Step S109 is finished, or it is determined that there is not an identified region R internally including no identified reaction point PS (all the identified regions R internally include the identified reaction points PS) ("NO" in Step S108), the controller 11 determines whether there is an identified reaction point PS outside of the set identified region R or not (Step S110). If it is determined that there is an identified reaction point PS outside of the set identified region R ("YES" in Step S110), the controller 11 newly sets an identified region R internally including an identified reaction point PS, or adjusts any existing identified region R so as to include an identified reaction point PS (Step S111). The controller 11 stores the information on the newly set identified region R or the adjusted identified region R, in the identified region data 122.

If Step S111 is finished, or it is determined that there is not an identified reaction point PS outside of the set identified region R ("NO" in Step S110), the controller 11 notifies the user by causing the display 15 to display the corrected content of the identified region R in Steps S105 to S111, and accepts adjustment of the identified region R by the user (Step S112 in FIG. 11).

The controller 11 transmits, to the sensor device 20, identified region information on the setting region of the appropriately corrected and adjusted latest identified region R (Step S113).

Upon receipt of the identified region information, the sensor controller 21 of the sensor device 20 stops the process pertaining to reflected waves reflected outside of the identified region R (Step S207). In other words, the sensor controller 21 detects the position and the velocity of the target selectively with respect to reflected waves reflected at the inside of the identified region R, and stops detecting the position and the velocity of the target with respect to the other reflected waves.

The sensor controller 21 starts to track the identified reflected waves from each identified reaction point PS, and transmits the vital data detected with respect to the identified reaction point PS together with the identified reaction point information to the information processing device 10 (Step S208). Hereinafter, the sensor controller 21 continuously executes generation and transmission of the vital data about the identified reaction point PS under tracking.

The controller 11 of the information processing device 10 having received the identified reaction point information and the vital data records the vital data, in association with the identified region R, in the recorded vital data 123 in the storage 12 (Step S114). The recorded vital data 123 may record the time when the vital data is recorded, together with the vital data.

Although omitted in FIGS. 10 and 11, the controller 11 of the information processing device 10 sets the identified region R, based on the latest image Im taken by the camera 13 at a predetermined frequency (Step S102), in parallel with vital data acquisition and storing (Step S114), and corrects and adjusts the identified region R (Steps S104 to S113). In parallel with this, the sensor controller 21 of the sensor device 20 generates and transmits the reaction point information and the identified reaction point information (Steps S203 to S206). The information on the latest identified region R is transmitted from the information processing device 10 to the sensor device 20. The sensor device 20 updates the operation setting so as to selectively detect reflected waves reflected at the inside of the identified region R, every time, based on the information. If the identified region R is changed, the distance information on the changed identified region R is transmitted from the information processing device 10 to the sensor device 20 (Step S103), and the sensor device 20 adjusts the detection distance (or the detection position of the sensor device 20), based on the distance information (Step S201). According to these operations, acquisition of the appropriate vital data can be continued, while the motion of the detection object 30 is flexibly supported.

(Error Handling Process)

Next, an error handling process for addressing a vital data acquisition error is described.

Figure 12:
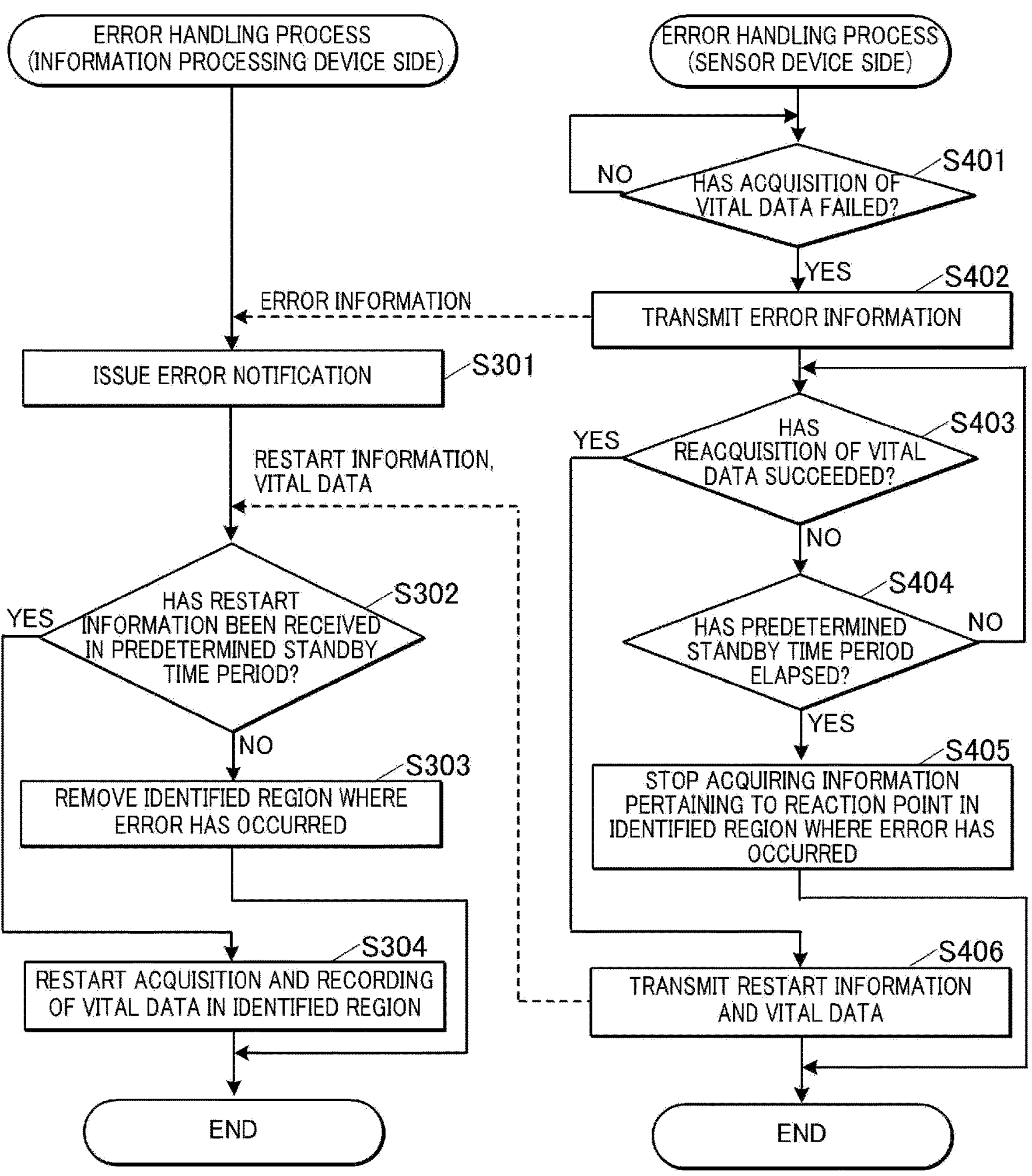
FIG. 12 is a flowchart showing control procedures for an error handling process.

FIG. 12 is a flowchart showing control procedures for the error handling process.

In FIG. 12, both the error handling process (process executed by the controller 11) in the information processing device 10, and the error handling process (process executed by the sensor controller 21) in the sensor device 20 are described. Data transmitted and received between the information processing device 10 and the sensor device 20 is indicated by broken lines.

In the error handling process, if the sensor controller 21 of the sensor device 20 fails to acquire the vital data about a certain identified region R ("YES" in Step S401), this controller transmits error information including the information on the identified region R where the vital data acquisition is failed, to the information processing device 10 (Step S402).

The controller 11 of the information processing device 10 having received the error information notifies the user of the error by causing the display 15 to display the content of the error about the identified region R indicated in the error information (Step S301).

On the other hand, the sensor controller 21 of the sensor device 20 tries to reacquire the vital data, and determines whether or not reacquisition of the vital data has succeeded in the certain identified region R described above (Step S403). If it is determined that reacquisition of the vital data has failed ("NO" in Step S403), the sensor controller 21 determines whether a predetermined standby time period (e.g., about several seconds to several minutes) has elapsed or not (Step S404). If it is determined that the predetermined standby time period has not elapsed yet ("NO" in Step S404), the sensor controller 21 returns the processing to Step S403, and tries to acquire the vital data again. If it is determined that the predetermined standby time period has elapsed ("YES" in Step S404), the sensor controller 21 stops acquiring the information on the reaction point P in the identified region R where the error has occurred (Step S405).

If it is determined that reacquisition of the vital data has succeeded in Step S403 ("YES" in Step S403), the sensor controller 21 transmits restart information indicating that acquisition of the vital data has been restarted, and the vital data, to the information processing device 10 (Step S406).

The controller 11 of the information processing device 10 issues the notification about the error in Step S301, and subsequently determines whether the restart information has been received in the predetermined standby time period or not (Step S302). It is determined that the restart information has not been received in the predetermined standby time period ("NO" in Step S302), the controller 11 removes the identified region R where the error has occurred, from the identified region data 122 (Step S303). If it is determined that the restart information has been received in the predetermined standby time period ("YES" in Step S302), the controller 11 restarts acquisition and recording of the vital data in the identified region R (Step S304). Here, the time when the recording of the vital data has been restarted may be recorded together.

According to such an error handling process, for example, when a person passes between the detection object 30, and the camera 13 and the sensor device 20, and detection of the vital data by the sensor device 20 is temporarily terminated, and when the detection object 30 moves (leaves the room) to the outside of the imaging range 101 and subsequently returns (re-enters the room) to the same position in the imaging range 101, acquisition of the vital data can be restarted while setting of the identified region R is maintained before and after the termination.

Note that for example, if the position where the detection object 30 resides when re-entering the room after leaving the room is different from the position before leaving the room, a new identified region R may be set in Steps S101 and S102 of the vital data acquisition process in FIG. 10. In this case, by facial recognition or the like of the detection object 30, it is determined whether the detection object 30 is identical or not before and after leaving the room. If the detection object 30 is determined to be identical, the identified region R before leaving the room, and the identified region R newly set after re-entering the room may be associated with each other, be continuously recorded as vital data on the identical detection object 30.

(Advantageous Effects)

As described above, the vital data acquisition system 1 according to one or more embodiments includes the controller 11. The controller 11 sets the identified region R, based on the imaged information (region setter), acquires the vital data based on the detection result by the sensor device 20 (acquirer), and determines whether the identified region R is correctly set or not based on the acquired vital data (determiner). Thus, based on the imaged information, the identified region R with respect to the detection object 30 is set, and then it can be determined whether the identified region R is appropriate or not based on the vital data. Consequently, even in a case where the position of the detection object 30 is not predetermined, the detection object 30 can be more appropriately identified, and the appropriate vital data of the detection object 30 can be acquired.

Furthermore, the controller 11 sets the identified region R with respect to the detection object 30 in the image Im taken by the camera 13, based on the information on the image Im (region setter), acquires the vital data detected from the detection result of some of identified reflected waves by the sensor device 20 among reflected waves of radio waves emitted to the imaging range 101 viewed from the camera 13 in the image Im (acquirer), and determines whether the identified region R is correctly set or not based on the relationship between the arrival direction of the identified reflected waves to the sensor device 20, and the identified region R (determiner). Thus, according to the determination method using the identified region R, and the arrival direction of identified reflected waves from which the vital data is detected, it can be appropriately determined whether the identified region R is appropriately set or not at the position corresponding to the detection object 30 (living body). According to the configuration described above, setting of the identified region R, and acquisition of the vital data can be performed by a non-contact method.

The controller 11 identifies each identified reaction point PS (reflection position of the identified reflected waves) in the imaging range 101, based on the arrival direction of the identified reflected waves, and determines that the identified region R is correctly set if the identified reaction point PS is in the identified region R, and determines that the identified region R is not correctly set if the identified reaction point PS is not in the identified region R (determiner). Thus, by the simple processing method of comparing the identified region R with the position of the identified reaction point PS, it can be appropriately determined whether the identified region R is correctly set or not. That is, only the identified region R where the body motion of the detection object 30, i.e., the living body, is detected can be determined as the correctly set identified region R.

The controller 11 identifies the reflection position of reflected waves in the imaging range 101, based on the arrival direction of reflected waves of radio waves, and if the reflection position (reaction point P) of reflected waves that represents that the target having reflected the radio waves is moving is not in the identified region R, this controller determines that the identified region R is not correctly set (determiner). Thus, even in the stage before detection of the vital data, it can be appropriately determined that the identified region R is not correctly set, based on there is no reaction point P is in the identified region R.

The controller 11 removes the identified region R determined not to be correctly set, or issues a notification of invalidity of the identified region R (region setter). Consequently, occurrence of a failure that is acquisition of inappropriate vital data in the inappropriate identified region R can be suppressed.

The controller 11 identifies each identified reaction point PS in the imaging range 101, based on the arrival direction of the identified reflected waves, and determines that the identified region R is not correctly set if an identified reaction point PS is outside of the set identified region R (determiner), and newly sets an identified region R internally including an identified reaction point PS, or adjusts the range of the set identified region R so as to internally include the identified reaction point PS, if the identified reaction point PS is outside of the set identified region R (region setter). Thus, in case of insufficient setting of the identified region R, this setting insufficiency can be appropriately compensated.

The controller 11 supplies the sensor device 20 with the sensor control information used to control the operation of the sensor device 20, and supplies the sensor device 20 with the identified region information on the setting region of the identified region R, as the sensor control information used for control of excluding reflected waves reflected outside of the identified region R determined to be correctly set, from the target of the detection process by the sensor device 20 (information supplier). Accordingly, the sensor device 20 can reduce the load of the process pertaining to the detection of reflected waves, and increase the speed of the process.

The sensor device 20 can change the detection distance, and the controller 11 supplies the sensor device 20 with the distance information on the distance from the sensor device 20 to the identified region R, as the sensor control information used for control of adjusting the detection distance by the sensor device 20 (information supplier). Accordingly, the detection distance at the sensor device 20 can be adjusted so as to appropriately detect the detection object 30.

The sensor device 20 is a radar that transmits and receives radio waves, and serves as a distance meter. Accordingly, the body motion of the detection object 30 can be accurately detected in a non-contact manner, and the vital data can be acquired.

If the identified region R is determined to be correctly set, the controller 11 records the vital data based on the identified reflected waves reflected at the inside of the identified region R, in association with the identified region R (record controller). Thus, for each identified region R (i.e., for each detection object 30), appropriate vital data can be acquired and recorded.

The controller 11 sets a plurality of identified regions R, based on the image Im (region setter), and determines whether the plurality of identified regions R are correctly set or not based on the vital data (determiner). Accordingly, even in the case of plurality of detection objects 30, the individual detection objects 30 are appropriately identified, and appropriate vital data can be acquired for each detection object 30.

The controller 11 sets the identified region R with respect to the detection object 30 in the imaging range 101, based on the recognition result of the detection object 30 by the machine learning model 124 achieved through machine learning using detection object information on the detection object 30 (region setter). Accordingly, the detection object 30 can be appropriately set at high speed, and the identified region R can be set.

If the identified region R is determined not to be correctly set, the controller 11 issues a notification of a result of the determination (notification controller). Accordingly, the user can recognize the situations pertaining to setting of the identified region R at appropriate timing.

The vital data acquisition method executed by the controller 11, which is a computer, in the vital data acquisition system 1 according to one or more embodiments includes: setting the identified region R, based on the imaged information; acquiring the vital data based on the detection result by the sensor device 20; and determining whether the identified region R is correctly set or not based on the acquired vital data. Thus, based on the imaged information, the identified region R with respect to the detection object 30 is set, and then it can be determined whether the identified region R is appropriate or not based on the vital data. Consequently, even in a case where the position of the detection object 30 is not predetermined, the detection object 30 can be more appropriately identified, and the appropriate vital data of the detection object 30 can be acquired.

The program 121 according to one or more embodiments causes the controller 11, which is a computer, in the vital data acquisition system 1 to function as: a region setter that sets the identified region R, based on the imaged information; an acquirer that acquires the vital data based on the detection result by the sensor device 20; and a determiner that determines whether the identified region R is correctly set or not based on the vital data. Thus, based on the imaged information, the identified region R with respect to the detection object 30 is set, and then it can be determined whether the identified region R is appropriate or not based on the vital data. Consequently, even in a case where the position of the detection object 30 is not predetermined, the detection object 30 can be more appropriately identified, and the appropriate vital data of the detection object 30 can be acquired.

The vital data acquisition system 1 according to one or more embodiments includes the controller 11. The controller 11 sets a plurality of identified regions R, based on the imaged information (region setter), acquires the vital data based on the detection result by the sensor device 20 (acquirer), and associates each of the plurality of set identified regions R, with the acquired vital data (association maker). Accordingly, based on the imaged information, the multiple identified regions R corresponding to the respective detection objects 30 are set, and then the vital data can be recorded in association with each identified region R, i.e., in association with each detection object 30. Consequently, even in the case of multiple identified regions R corresponding to the respective detection objects 30, the vital data can be appropriately recorded with respect to each detection object 30.

(Others)

The present invention is not limited to the embodiments described above and the modifications, and may be variously changed.

For example, the configuration where the vital data acquisition system 1 includes the information processing device 10 and the sensor device 20 is exemplified. However, there is no limitation to this configuration. For example, the functions executed by the information processing device 10 and the sensor device 20 may be executed by a single device. Alternatively, the functions executed by the information processing device 10 and the sensor device 20 may be shared by two or three or more devices in any sharing mode, and executed. For example, among the functions executed by the information processing device 10 in the embodiments described above, the function of setting the identified region R, based on the image data of the image Im, and the function of determining whether the identified region R is correctly set or not based on the reaction point information and the identified reaction point information received from the sensor device 20, may be executed by separate devices.

The installation positions of the camera 13 and the sensor device 20 are not limited to the ceiling of the room 100. These may be installed at freely selected positions in the room, such as on a wall or a stage. The camera 13 and the sensor device 20 may be provided outside of the room, or used to detect the detection object 30 outside of the room.

The millimeter-wave radar is exemplified as the sensor device 20. However, radio waves transmitted and received by the sensor device 20 are not limited to millimeter waves. Alternatively, submillimeter waves having a wavelength less than 1 mm, quasi-millimeter waves having a wavelength longer than 10 mm, or microwaves may be used.

The FMCW scheme is exemplified as the scheme of the sensor device 20. However, there is no limitation to this. For example, the UWB (Ultra-Wide Band) scheme that uses radio waves having a significantly wide bandwidth and a significantly short pulse width may be used. In the case of adjusting the detection distance according to the UWB scheme, at least one of the magnitude of the bandwidth, and the center frequency may be adjusted.

As the method of issuing various notifications pertaining to setting of the identified region R and acquisition of the vital data, the method of causing the display 15 to perform display pertaining to the notifications is exemplified. However, the notification method is not limited to this. As the notification method, a method of issuing a notification by sound or light, and a method of transmitting information on a notification from the information processing device 10 to a terminal device used by the user may be used.

Some embodiments of the present invention have been described. However, the scope of the present invention is not limited to that of the embodiments described above, but includes the scope of the invention described in the claims and their equivalent ranges.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A vital data acquisition system, comprising:

a hardware processor that:

sets a plurality of identified regions with respect to detection objects in an image taken by a camera, based on imaged information on the image, acquires vital data based on, as a detection result, some of identified reflected waves by a sensor among reflected waves of radio waves emitted to an imaging range of the image viewed from the camera, and determines, based on the vital data, whether the identified regions are correctly set based on a relationship between each of the identified regions and an arrival direction of the identified reflected waves to the sensor.

2. The vital data acquisition system according to claim 1, wherein the hardware processor:

identifies a reflection position of the identified reflected waves in the imaging range, based on the arrival direction of the identified reflected waves, in a case that the reflection position of the identified reflected waves is within each of the identified regions, determines that the identified regions are correctly set, and in a case that the reflection position of the identified reflected waves is not within each of the identified regions, determines that the identified regions are not correctly set.

3. The vital data acquisition system according to claim 1, wherein the hardware processor:

identifies a reflection position of the reflected waves in the imaging range, based on an arrival direction of the reflected waves, the reflection position of the reflected waves representing that a target reflecting the radio waves is moving, and in a case that the reflection position of the reflected waves is not within each of the identified regions, determines that the identified regions are not correctly set.

4. The vital data acquisition system according to claim 2, wherein the hardware processor executes at least one of:

removing the identified regions that are determined not to be correctly set, and issuing a notification of invalidity of the identified regions.

5. The vital data acquisition system according to claim 1, wherein the hardware processor:

identifies a reflection position of the identified reflected waves in the imaging range, based on the arrival direction of the identified reflected waves, in a case that the reflection position of the identified reflected waves is outside of the identified regions, determines that the identified regions are not correctly set, and executes at least one of:

newly setting another identified region internally including the reflection position of the identified reflected waves, and adjusting a range of the identified regions so as to internally include the reflection position of the identified reflected waves.

6. The vital data acquisition system according to claim 1, wherein the hardware processor:

supplies the sensor with sensor control information to control an operation of the sensor, and supplies the sensor with, as the sensor control information, setting region information of the identified regions to exclude, from a target of a detection process by the sensor, the reflected waves reflected outside of the identified regions that are determined to be correctly set.

7. The vital data acquisition system according to claim 1, wherein the hardware processor supplies the sensor with sensor control information to control an operation of the sensor, the sensor is configured such that a detection distance of the sensor is adjustable, and the hardware processor supplies the sensor with, as the sensor control information, distance information on a distance from the sensor to each of the identified regions to adjust the detection distance.

8. The vital data acquisition system according to claim 1, wherein the sensor is a radar that transmits and receives radio waves, and serves as a distance meter.

9. The vital data acquisition system according to claim 1, wherein upon determining that the identified regions are correctly set, the hardware processor records the vital data, based on the identified reflected waves reflected at an inside of the identified regions, in association with the identified regions.

10. The vital data acquisition system according to claim 1, wherein the hardware processor sets the identified regions with respect to the detection objects in the imaging range, based on a recognition result of the detection objects by a machine learning model achieved through machine learning using detection object information pertaining to the detection objects.

11. The vital data acquisition system according to claim 1, wherein upon determining that the identified regions are not correctly set, the hardware processor issues a notification of a result of the determination.

12. A vital data acquisition method executed by a hardware processor of a vital data acquisition system, the method comprising:

setting a plurality of identified regions with respect to detection objects in an image taken by a camera, based on imaged information on the image;

acquiring vital data based on, as a detection result, some of identified reflected waves by a sensor among reflected waves of radio waves emitted to an imaging range of the image viewed from the camera; and determining, based on the vital data, whether the identified regions are correctly set based on a relationship between each of the identified regions and an arrival direction of the identified reflected waves to the sensor.

13. A non-transitory computer readable storage medium storing instructions causing a computer of a vital data acquisition system to execute:

setting a plurality of identified regions with respect to detection objects in an image taken by a camera, based on imaged information on the image;

acquiring vital data based on, as a detection result, some of identified reflected waves by a sensor among reflected waves of radio waves emitted to an imaging range of the image viewed from the camera; and determining, based on the vital data, whether the identified regions are correctly set based on a relationship between each of the identified regions and an arrival direction of the identified reflected waves to the sensor.

14. A vital data acquisition system comprising:

a hardware processor that:

sets a plurality of identified regions with respect to detection objects in an image taken by a camera, based on imaged information on the image, acquires vital data based on, as a detection result, some of identified reflected waves by a sensor among reflected waves of radio waves emitted to an imaging range of the image viewed from the camera, associates each of the identified regions, with an arrival direction of the identified reflected waves to the sensor, and determines whether the identified regions are correctly set based on the vital data.

* * * * *